Dec. 14, 1954 A. A. MACDONALD ET AL 2,697,132
BALANCED METALLIC SYSTEM
Filed May 28, 1952
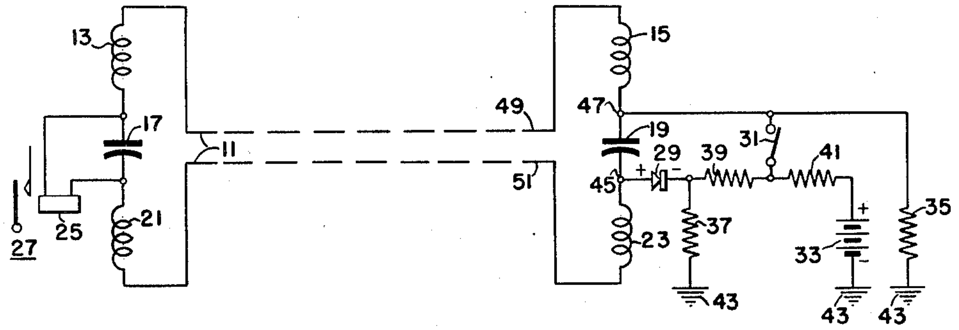
WITNESSES:
John E. Healy
Wm. T. Wofford
INVENTOR
Lawrence R. Smith and
Angus A. Mac donald.
BY
F. E. Browder
ATTORNEY United States Patent Office 2,697,132

Patented Dec. 14, 1954

2,697,132

BALANCED METALLIC SYSTEM

Angus A. Macdonald, Catonsville, Md., and Lawrence R. Smith, Mission, Kans., assignors to Westinghouse Electric Corporation, East Pittsburgh, Pa., a corporation of Pennsylvania Application May 28, 1952, Serial No. 290,586

3 Claims. (Cl. 179—2)

The present invention relates to balanced metallic systems and more particularly to circuits for switching a grounded direct-current power supply to a balanced metallic telephone pair without unbalancing the telephone pair.

It is often desirable to provide for remote control of apparatus over a telephone line by applying a direct-current voltage to the line. Two commonly used arrangements for accomplishing such remote control are known as the "simplex" and "balanced metallic" systems. In the simplex system, the telephone line conductors are in parallel for the direct-current voltage, and the direct current is returned through the relay to be controlled via the earth. This system may use a grounded direct-current power supply, which is usually available at no extra cost, but in many instances the earth resistance may be too large for efficient operation, and when ground currents are present severe interference will be encountered. The balanced metallic system eliminates the disadvantages of a ground return, but requires an ungrounded direct-current power supply if a single pole switch is to be used for closing the direct-current circuit. An ungrounded power supply is not usually readily available but must be supplied at additional cost.

The balanced metallic system may be used with a grounded power supply providing a double pole switch is used. The switch used for controlling the direct-current circuit normally comprises contacts of a relay which has a number of functions in addition to that of applying direct-current voltage to the telephone pair. If, for example, a radio transmitter is to be remotely controlled over a telephone pair, the direct-current voltage on the line would control the transmitter off-on relay. In addition, in order to modulate the transmitter, the line transformer at the control station would need to be switched from the input of an audio amplifier to the output of the amplifier, and a microphone would need to be switched to the amplifier input. Additional switching functions such as that of switching a speaker for talking-back operations are also desirable. In general, if it is possible to eliminate a pair of relay contacts in performing a switching operation, then those contacts are available for other switching functions, and the versatility of the control station is increased.

It is accordingly an object of the present invention to provide an improved balanced metallic arrangement wherein a grounded direct-current power supply is used, and a minimum number of switch contacts are required for switching the power supply to the direct-current circuit.

Another object of the invention is to provide an improved circuit for switching a grounded direct-current power supply to a balanced metallic telephone pair without unbalancing the telephone pair.

Another object of the invention is to provide a circuit in which only a single pair of contacts is required for switching a grounded direct-current supply to a balanced metallic telephone pair without unbalancing the telephone pair.

The features of our invention, which we consider novel, are set forth in the appended claims. The invention, together with additional objects and advantages thereof will be understood from the following description of a specific embodiment when read in connection with the accompanying drawing in which the single figure is a schematic diagram showing a preferred embodiment of the invention.

In the drawing there is shown a telephone pair 11 connected to operate in a balanced metallic system. In the balanced metallic system, a loop for alternating currents is formed by connecting the usual serial combination of an inductance 13, 15, a capacitor 17, 19, and a second inductance 21, 23 across the telephone pair 11 at each end of the telephone line, respectively. The operating winding 25 of a relay 27 which is to be remotely controlled from one end of the telephone line is connected across the capacitor 17 at the remote end of the line. The control circuit for the relay is connected to the terminals of the capacitor 19 at the control end of the telephone line. The relay control circuit includes a unidirectional conducting element 29, contact means 31, a grounded direct-current power supply 33, first and second resistors 35, 37, and a bias resistor 39. The direct-current power supply is shown as a battery 33. The impedance of the power supply 33 is represented by a resistor 41, shown connected in series with the battery 33. The contact means 31 is shown schematically as a single pole switch 31 having a stationary contact and a movable contact. The contact means could be any suitable one of the well-known means for making or breaking the electrical connection between two points on a single line. The contact means could, for example, be a single pair of contacts on a multiple contact relay. The uni-directional coupling element, shown as a dry rectifier 29, could also be a vacuum diode or other suitable device. In the drawing, the rectifier 29 has its positive side connected to one terminal 45 of the capacitor 19 and its negative side connected through the second resistor 37 to ground 43. The bias resistor 39 is connected between the negative side of the rectifier 29 and the positive terminal of the battery 33. The negative terminal of the battery 33 is connected to ground 43. The switch 31 is connected between the other terminal 47 of the capacitor 19 and the positive terminal of the battery 33. The first resistor 35 is connected between the other terminal 47 of the capacitor 19 and ground 43.

In operation, when the switch 31 is closed, direct current flows out over one conductor 49 of the telephone pair 11, through the relay operating winding 25, back through the other conductor 51 of the telephone pair, the forward resistance of the rectifier 29, and through the second resistor 37 to ground. The magnitudes of the first and second resistors 35, 37 are chosen such that the sum of the second resistor 37 in series with the forward resistance of the rectifier 29 is substantially equal to the parallel combination of the first resistor 35 and the direct-current source resistance 41. When the switch 31 is open, the bias resistor 39 and the second resistor 37 bias the rectifier 29 so that its back resistance is substantially equal to that of the first resistor 35. This arrangement provides a substantially balanced system for both the energized and deenergized conditions of the relay 27.

By way of illustration to aid others in duplicating applicants' results, it may be stated that a circuit in accordance with the invention was found to operate successfully with the following circuit constants: direct-current supply voltage, 90 volts; direct-current supply impedance, 3500 ohms; second resistor, 3000 ohms; first resistor, 1 megohm; bias resistor, 22,000 ohms; rectifier, commercial type IN-34.

While we have shown our invention in only one form, it will be obvious to those skilled in the art that it is not so limited, but is susceptible to various changes and modifications without departing from the spirit thereof.

We claim as our invention:

1. A circuit for switching a grounded direct current power supply to a balanced metallic telephone pair comprising, first and second terminals adapted for connection to the telephone pair, a first impedance connected between said first terminal and ground, a unidirectional conducting element connected between said second terminal and the positive terminal of the direct current power supply, said element being poled to conduct in the direction from said second terminal to ground, a second impedance connected in shunt with the direct current power supply, and contact means for connecting said first terminal to the positive terminal of the power supply, the magnitudes of said impedances being chosen such that the forward impedance of said element plus the second impedance is substantially equal to the impedance of the parallel combination of the direct current power supply and said first impedance.

2. A circuit for switching a grounded direct current power supply to a balanced metallic telephone pair comprising, first and second terminals adapted for connection to the telephone pair, a first resistance connected between said first terminal and ground, a rectifier connected between said second terminal and the positive terminal of the direct current power supply, said rectifier being poled to conduct in the direction from said second terminal to ground, a second resistance connected in shunt with the direct current power supply, and contact means for connecting said first terminal to the positive terminal of the power supply, the magnitudes of said resistances being chosen such that the forward resistance of said rectifier plus the second resistance is substantially equal to the parallel combination of the resistance of the power supply and said first resistance.

3. A circuit for switching a grounded direct current power supply to a balanced metallic telephone pair comprising, first and second terminals adapted for connection to the telephone pair, a first resistance connected between said first terminal and ground, a rectifier and a bias resistance serially connected between said second terminal and the positive terminal of the direct current power supply, said rectifier being poled to conduct in the direction from said second terminal to ground, a second resistance connected in shunt with said bias resistance and the direct current power supply, and contact means for connecting said first terminal to the positive terminal of the power supply, the magnitude of said resistances being chosen such that the forward resistance of said rectifier plus the second resistance is substantially equal to the parallel combination of the power supply and said first resistance.

References Cited in the file of this patent

UNITED STATES PATENTS

| Number | Name | Date |
|---|---|---|
| 1,646,354 | Drake | Oct. 18, 1927 |